(12) United States Patent
Mayo (10) Patent No.: US 9,193,139 B2
(45) Date of Patent: Nov. 24, 2015

(54) REVERSIBLE POLYMER ADHESIVE COMPOSITION

(71) Applicant: XEROX CORPORATION, Norwalk, CT (US)

(72) Inventor: James D. Mayo, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 378 days.

(21) Appl. No.: 13/905,729

(22) Filed: May 30, 2013

(65) Prior Publication Data

US 2014/0352884 A1 Dec. 4, 2014

(51) Int. Cl.
| | |
|---|---|
| *B32B 37/12* | (2006.01) |
| *C09J 177/00* | (2006.01) |
| *C08G 73/12* | (2006.01) |
| *C08G 73/14* | (2006.01) |
| *C09J 179/08* | (2006.01) |

(52) U.S. Cl.
CPC .......... *B32B 37/1207* (2013.01); *B32B 37/1284* (2013.01); *B32B 37/1292* (2013.01); *C08G 73/121* (2013.01); *C08G 73/128* (2013.01); *C08G 73/14* (2013.01); *C09J 177/00* (2013.01); *C09J 179/085* (2013.01); *B32B 2037/1223* (2013.01); *B32B 2307/31* (2013.01); *B32B 2309/02* (2013.01); *B32B 2355/00* (2013.01); *B32B 2405/00* (2013.01); *C09J 2477/00* (2013.01)

(58) Field of Classification Search
CPC ............ B32B 37/1207; B32B 37/1292; B32B 37/1284; C09J 177/00
See application file for complete search history.

(56) References Cited

U.S. PATENT DOCUMENTS

| | | | |
|---|---|---|---|
| 4,303,924 A | 12/1981 | Young, Jr. | |
| 4,978,969 A | 12/1990 | Chieng | |
| 5,270,368 A | 12/1993 | Lent et al. | |
| 5,623,001 A | 4/1997 | Figov | |
| 5,844,020 A | 12/1998 | Paine et al. | |
| 5,952,402 A | 9/1999 | Paine et al. | |
| 6,042,227 A | 3/2000 | Meinhardt et al. | |
| 6,825,315 B2 * | 11/2004 | Aubert .......................... | 528/393 |

OTHER PUBLICATIONS

Luo, X. et al., "A thermally responsive, rigid, and reversible adhesive," Polymer 51 (2010) 1169-75.*
Luo, X. et al., "A Thremally Responsive, Rigid, and Reversible Adhesive," *Polymer*, 51, 1169-75 (2010).
Aubert, J.H., "Thermally Removable Epoxy Adhesives Incorporating Thermally Reversible Diels-Alder Adducts," *J. Adhesion*, 79, 609-616 (2003).
Wouters, M. at al., "Tuneable Adhesion Through Novel Binder Technologies," *Prog. Org. Coatings*, 72, 152-158 (2011).
U.S. Appl. No. 13/905,833, filed May 30, 2013.
U.S. Appl. No. 13/905,309, filed May 30, 2013.
U.S. Appl. No. 13/905,314, filed May 30, 2013.
U.S. Appl. No. 13/905,658, filed May 30, 2013.

* cited by examiner

*Primary Examiner* — Daniel Lee
(74) *Attorney, Agent, or Firm* — Pillsbury Winthrop Shaw Pittman LLP (57) ABSTRACT

A method of joining two objects includes applying an adhesive composition between and in contact with a first object and a second object, and allowing the adhesive composition to harden to form an adhesive bond between the first and second objects, wherein the adhesive composition consists essentially of an optional stabilizer and a reversible polymer material that can reversibly transition between a liquid state and a solid state by reversible cycloaddition reactions, wherein upon cooling, the reversible polymer material transitions from a liquid state to a solid state by reversible cycloaddition reactions within a time period of less than about 2 minutes.

20 Claims, 2 Drawing Sheets

REVERSIBLE POLYMER ADHESIVE COMPOSITION

TECHNICAL FIELD

The present disclosure is generally directed to a reversible polymer adhesive composition comprising a reversible polymer material that can reversibly transition between a liquid state and a solid state by reversible cycloaddition reactions and that in the solid state forms a hard polymer film, and to a method of reversibly adhering objects together using the reversible polymer adhesive composition.

BACKGROUND

Reversible Diels-Alder based polymers are generally known, and have been investigated for use in solid ink printing. These are disclosed, for example, in U.S. Pat. Nos. 5,844,020, 5,952,402, and 6,042,227. These reversible Diels-Alder based polymers would be particularly useful in ink jet applications, because the ink jet apparatus allows for precise, imagewise control of the placement of material, and thus would allow for the production of precise, hard polymer films possessing the reversible adhesion and solid-to-liquid conversion properties.

However, the Diels-Alder based polymers previously investigated suffered from long solidification times after being deposited on a substrate. For example, it was found that many of the prior Diels-Alder based polymers had solidification times on the order of several hours, making them unsuitable for use in most printing applications. Long solidification times are unsuitable in most printing applications because while the printed material remains in a liquid or semi-liquid state, the image can become distorted, image quality can degrade, and the printed images cannot be stacked on top of each other resulting in either large space needs or low throughput.

Accordingly, there is a need for improved materials that exhibit the reversible polymerization property, but that have shorter solidification times to permit their efficient and economical use in commercial processes.

A wide variety of adhesive materials are also known, including epoxy-based adhesives, acrylate-based adhesives, and the like. Such materials have been shown to provide very strong bonding properties. However, many of these adhesive materials are irreversible. That is, the objects that are bonded together cannot be easily separated or separated without damage or destruction to the objects.

The concept of reversible adhesives has been previously described. For example, one such reversible adhesive system is described in Luo, X. et al., *Polymer* 2010, 51, 1169-75; Aubert, J. H., *J. Adhesion* 2003, 79, 609-616; Wouters, M. et al., *Prog. Org. Coatings* 2011, 72, 152-158; and U.S. Pat. No. 6,825,315, the entire disclosures of which are incorporated herein by reference. The described system uses a combination of epoxy or acrylate materials and Diels-Alder materials.

In the systems described, irreversible epoxy or acrylate chemistry is used as the adhesion force, while the Diels-Alder chemistry only provides the means for reversibility. Because the Diels-Alder materials are present, heating and cooling of the substrate will result in delamination or re-adhesion. However, in these examples the surface is irreversibly altered once the epoxy groups are affixed. Total restoration or cleaning of the surface would require mechanical removal of the epoxy residue, which could possibly damage the substrate, and more importantly would prevent re-adherence of the materials.

Thus, there remains a need in the art for improved adhesives that allow for reversible adhesive of objects, yet without any permanent alteration or damage to the objects being adhered.

SUMMARY

The present disclosure in embodiments addresses the above and other needs by providing an adhesive composition, where the composition comprises a reversible polymer material that can transition from a liquid state to a solid state that this is a hard polymer film. The present disclosure also provides methods for using that adhesive composition to adhere, and in embodiments reversibly adhere, two objects together.

More particularly, the present disclosure provides a method of joining two objects, comprising:

applying an adhesive composition between and in contact with a first object and a second object, and allowing the adhesive composition to harden to form an adhesive bond between the first and second objects, wherein the adhesive composition consists essentially of an optional stabilizer and a reversible polymer material that can reversibly transition between a liquid state and a solid state by reversible cycloaddition reactions, wherein upon cooling, the reversible polymer material transitions from a liquid state to a solid state by reversible cycloaddition reactions within a time period of less than about 2 minutes.

In another embodiment, the present disclosure provides a method of joining two objects, comprising:

applying an adhesive composition to a surface of a first object, contacting a surface of a second object to the adhesive composition on the surface of the first object, and allowing the adhesive composition to harden to form an adhesive bond between the first and second objects, wherein the adhesive composition consists essentially of an optional stabilizer and a reversible polymer material that can reversibly transition between a liquid state and a solid state by reversible cycloaddition reactions, wherein the composition has a viscosity of from about 2 to about 20 cPs at a temperature of from about 75 to about 120° C. and upon cooling, the reversible polymer material transitions from a liquid state to a solid state by reversible cycloaddition reactions within a time period of less than about 2 minutes.

In another embodiment, the present disclosure provides a method of reversibly joining two objects, comprising:

joining two objects by the method of claim 1, heating the adhesive composition forming the adhesive bond to break the adhesive bond between the first and second objects, and separating the first object from the second object, wherein the heating reversibly transitions the adhesive composition from a solid state to a liquid state by reversing the cycloaddition reactions.

DETAILED DESCRIPTION

The present disclosure provides adhesive compositions comprising a reversible polymer material. The compositions comprise a reversible polymer material formed from constituent materials based on Diels Alder chemistry, which can quickly reversibly transition between a liquid non-adhesive or non-tacky state and a solid adhesive or tacky state by reversible cycloaddition reactions. The compositions can be used in a variety of applications where it is desirable to form an adhesive bond, such as a reversible adhesive bond, between two objects or substrates. Furthermore, the present inventor found that the compositions demonstrate excellent and unexpected adhesion to a number of substrates, including aluminum, glass, and stainless steel.

In the heated liquid state, the composition in embodiments is a low viscous liquid that can be readily applied by a variety of coating methods, such as spraying, coating, ink jetting, and the like. Upon cooling, the composition quickly undergoes reversible cycloaddition reactions that convert the liquid composition into a cured polymer film that adheres two objects or substrates together. Thus, in its liquid state, the adhesive compositions of embodiments are non-adhesive and non-tacky, but they are adhesive and tacky in their solid state.

Composition

The composition includes as an essential component a reversible polymer material, which can reversibly transition between a liquid state and a solid state by reversible cycloaddition reactions. In embodiments, the reversible polymer is formed from constituent materials based on Diels Alder chemistry. These materials are "curable" in that they can be deposited on a substrate in a liquid state, making them suitable for such deposition methods as spraying, coating, ink jet printing, and the like. The materials have end groups suitable for Diels Alder cycloadditions and co-exist in the molten or liquid state as a very low viscosity liquid. However, as the materials are cooled, cycloaddition takes place, resulting in hard polymers with excellent film forming and adhesion characteristics. The reversible polymer material is thus particularly useful in commercial applications because it can be easily applied while in the non-adhesive molten state, but form a hard adhesive polymer when solidified in a short amount of time. The reversible nature of the reaction also allows the composition to be repeatedly heated and cooled either in the application device before application to a substrate, allowing for amounts of the composition to be applied at different times as needed, as well as when applied to a substrate, allowing for repeated adhesion and removal (such as lamination and delamination) of the substrates.

Reverse Diels-Alder based polymers are generally known, and have been investigated for use in solid ink printing, as exemplified for example by U.S. Pat. Nos. 5,844,020, 5,952, 402, and 6,042,227. However, the Diels-Alder based polymers previously investigated suffered from long solidification times after being deposited on a substrate. For example, it was found that many of the prior Diels-Alder based polymers had solidification times on the order of several hours, making them unsuitable for use in most printing applications. Long solidification times are unsuitable because while the printed material remains in a liquid or semi-liquid state, the image can become distorted, image quality can degrade, and the printed images cannot be stacked on top of each other resulting in either large space needs or low throughput. Even if the prior materials possessed adhesive properties when cured, the curing time was so long that the materials could not be reasonably used in adhesive applications.

In contrast, the reversible polymer materials of the present disclosure have solidification times on the order of seconds to several minutes, making them more suitable for use in adhesive applications. Due to the faster solidification times, the deposited adhesive material better retains its applied geometry (without flowing across or over a substrate), and thus faster adhesion of substrates can be achieved. Thus, in embodiments, the solidification time of the reversible polymer material is less than about two minutes, less than about one minute, less than about 30 seconds, less than about 15 seconds, less than about 10 seconds, less than about 5 seconds, or less than about 3 seconds. For example, for fast setting adhesives, the solidification time for the reversible polymer material can be from about 0.01 second or from about 0.05 second or from about 0.1 second to about 0.5 second or about 1 second or about 5 seconds, while for slower setting adhesives, the solidification time can be from about 5 seconds or from about 10 seconds or from 20 seconds to about 30 seconds or about 1 minute or about 2 minutes. By "solidification" herein it is meant that the sample is hardened and emits an audible clicking sound when tapped with a spatula. For example, when samples are prepared as films not exceeding 5 mm in thickness, and the films are applied to substrates that are at about room temperature, the rate of cooling is very fast and does not play a role in the solidification times of each of the samples. In these samples, the solidification time is taken to be the time after the rapid cooling to ambient or room temperature. The degree of polymerization can also be measured using $^1$H NMR spectroscopy, although it has been found that the degree of polymerization does not necessarily correlate with solidification times.

To achieve these faster solidification times, embodiments of the present disclosure utilize reversible polymer materials that are formed from maleimides and furans, with varying linking chemistry. The maleimides and furans can be in any form, such as bismaleimides and bisfurans, trigonal maleimides and trigonal furans, and the like. The linking groups can vary in length and chemistry and can include, for example, linear or branched alkyl groups, cyclic alkyl groups, aryl groups, arylalkyl groups, alkylaryl groups, alkylenedioxy groups, and the like, all of which can be substituted or unsubstituted. Although not limited, it is believed that as the size of linking group increases, the solidification time increases. For example, as the number of carbon atoms in the linking group increases, or as the number of oxygen atoms (such as in alkyleneoxy groups) in the linking group increases, the solidification time also tends to increase. Of course, it still may be possible to use compounds with otherwise slower solidification times, for example, if they are used in combination with other materials having a faster solidification time.

For example, suitable bismaleimides and bisfurans are represented by the following structures:

where R is the linking group. For example, R can be an alkyl group, such as a linear alkyl group having from 1 or from about 2 to about 20 carbon atoms, from about 3 to about 15 carbon atoms, or from about 4 or about 5 or about 6 carbon atoms to about 8 or about 10 or about 12 carbon atoms; a cyclic alkyl group such as a cyclic alkyl group having about 5 or about 6 carbon atoms to about 8 or about 10 carbon atoms; an aryl group such as a phenyl group or a naphthyl group; an alkylenedioxy group having from 1 or from about 2 to about 20 carbon atoms, or from about 2 to about 10 carbon atoms, or from about 3 to about 8 carbon atoms, such as an ethylenedioxy group; or the like.

In other embodiments, trigonal structures can be used. For example, suitable trigonal maleimides and furans are represented by the following structures:

and where R' is $NR_3$, where each R is the same or different and is the linking group as defined above. Specific embodiments of the trigonal maleimides and furans where R' is $N(CH_2)_3$— are represented by the following structures:

In still other embodiments, other forms of maleimides and furans can be used, and it will be understood that the present disclosure is not limited to bis- or tris- structures.

The maleimides and furans can be made by reactions known in the art, modified as will be apparent to incorporate desired linking groups. For example, the bismaleimides can be readily prepared by reacting maleic anhydride with a suitable reactant such as a diamino compound. In a similar manner, the bisfurans can be readily prepared by reacting 2-furoyl chloride with a suitable reactant such as a diamino compound. In one embodiment, where the diamino compound is a diaminoalkane, such as diaminooctane, the bismaleimide and bisfuran can be prepared as follows:

where R is the linking group as described above. Similar reaction schemes can be used to prepare the trigonal maleimides and furans.

So that the Diels-Alder cycloaddition reactions can proceed, the reversible polymer material in embodiments includes a mixture of maleimide monomer units or species and furan monomer units or species. Heating the solid maleimide/furan mixture above its melting point results in very low viscosity liquids. However, cooling of the mixtures promotes Diels-Alder coupling, resulting in the formation of polymers. Heating the polymers above the melting point of the constituent maleimide and furan species reverses the process, re-generating the low viscosity liquid. This reversible transition of the materials from monomer units or species to polymer is exemplified for one set of materials by the following reaction scheme:

It has also been discovered that this reversible heating-cooling process not only causes a transition between a hard polymer film and a liquid mixture, but also causes a transition between an adhesive film that bonds adjoining surfaces and a non-adhesive or non-tacky liquid mixture that frees the adhesion between the adjoining surfaces. That is, when the composition is placed between two adjoining surfaces, the heating/cooling causes a lamination/delamination of the surfaces, which is reversible by additional heating/cooling cycles.

In forming the mixture of maleimide monomer units or species and furan monomer units or species, it is desired in embodiments that the materials be in approximately equimolar amounts of functional groups. Thus, for example, where the mixture is formed from bismaleimides having two reactive functional groups and bisfurans having two reactive functional groups, the bismaleimides and bisfurans are desirably present in a molar ratio of about 1:1, such as from about 1.5:1 to about 1:1.5, or from about 1.3:1 to about 1:1.3, from about 1.2:1 to about 1:1.2, or from about 1.1:1 to about 1:1.1. Similarly, where the mixture is formed from trigonal maleimides having three reactive functional groups and trigonal furans having three reactive functional groups, the trigonal maleimides and trigonal furans are desirably present in a molar ratio of about 1:1, such as from about 1.5:1 to about 1:1.5, or from about 1.3:1 to about 1:1.3, from about 1.2:1 to about 1:1.2, or from about 1.1:1 to about 1:1.1. However, where the mixture is formed from bismaleimides having two reactive functional groups and trigonal furans having three reactive functional groups, or from trigonal maleimides having three reactive functional groups and bisfurans having two reactive functional groups, the maleimides and furans are desirably present in a molar ratio of the trigonal material to the bis material of about 2:3, such as from about 2.5:3 to about 2:2.5, or from about 2.3:3 to about 2:2.7, from about 2.2:3 to about 2:2.8, or from about 2.1:3 to about 2:2.9. Although other ratios of the materials can be used, the reversible polymer material will have too much residual liquid material if the ratio of materials diverges too far from being equimolar. That is, as the ratio becomes unbalanced, there will be too much of one constituent material to react with the other material to form the reversible polymer in the solid state. The excess unreacted material will therefore only serve to dilute the coupled reversible polymer and compromise its mechanical integrity.

Although not required, it is also desired in embodiments that the materials used to form the mixture have the same linking group, or at least the same general type of linking group. Where the mixture is formed from the depicted maleimides and furans shown above, it is desirable that the maleimides and furans have the same linking group R, or at least the same type of linking group R. Thus, for example, the linking group of the maleimides and furans in embodiments is each an alkyl group, such as each a linear alkyl group of the same chain length; is each a cyclic alkyl group such as each a cyclic alkyl group having the same structure and number of carbon atoms; is each an aryl group, such as each a phenyl group; is each an alkylenedioxy group such as each an ethylenedioxy group; or the like. Mixtures of different spacer groups can be accommodated, provided the chemistries in each of the spacer groups are compatible with one another, such that the two compounds are miscible in each other. For example, mixtures having very dissimilar polarities would be inappropriate, as the two reagents would be unstable and would undergo phase separation. Of course, if desired, different linking groups can be used in the materials.

Similarly, in embodiments it is desired that the materials used to form the mixture be one faun of maleimide and one form of furan. This allows the Diels-Alder reaction to more rapidly progress because the counter functional groups of the materials are more closely positioned to each other in the mixture. However, if desired, more than one type of maleimide and/or more than one type of furan can be used in forming the mixture. Thus, for example, the mixture can be formed from one type of maleimide and one type of furan, or can be formed from one, two, three, or more different maleimides and one, two, three, or more different furans, to provide desirable properties of both the liquid mixture and the solid reversible polymer.

In forming the adhesive mixture, the mixture contains at least the reversible polymer material, such as the mixture of the maleimide monomer units or species and furan monomer units or species. Because the ability of the monomers to react together by Diels-Alder cycloaddition reactions is dependent upon the materials readily contacting each other, it is desired that as few additional ingredients as possible be included in the mixture. Thus, for example, in one embodiment the mixture consists entirely of only the maleimide monomer units or species and furan monomer units or species; in other embodiments, the mixture consists essentially of the maleimide monomer units or species and furan monomer units or species, plus additional materials that do not interfere with the ability of the monomers to react to form the reversible polymer material. In still other embodiments, additional components may be included for other intended purposes. Of course, it will be appreciated in each of these variants that the mixture may also include incidental impurities and the like. Where additional materials are included in the mixture in addition to the maleimides and furans, the maleimides and furans can together be present in the mixture in a majority amount, such as from about 50, about 60, about 70, or about 80 to about 90, about 95, or about 100 percent by weight, or the maleimides and furans can together be present in the mixture in a minority amount, such as from about 1, about 5, about 10, or about 20 to about 30, about 40, or about 50 percent by weight, based on a total weight of the composition including the mixture.

If desired, the composition can include other additives for their conventional purposes. For example, the composition can include one or more of light stabilizers, UV absorbers (which absorb incident UV radiation and convert it to heat energy that is ultimately dissipated), antioxidants, optical brighteners (which can improve the appearance of the image and mask yellowing), thixotropic agents, dewetting agents, slip agents, foaming agents, antifoaming agents, flow agents, waxes, oils, plasticizers, binders, electrical conductive agents, organic and/or inorganic filler particles, leveling agents (agents that create or reduce different gloss levels), opacifiers, antistatic agents, dispersants, colorants (such as pigments and dyes), biocides, preservatives, and the like. However, additives may negatively affect the speed and degree of the reversible cycloaddition reactions, and thus care must be taken when formulating a composition using optional additives.

For example, in some embodiments, it may be helpful to include a radical scavenger in the composition. It has been found that for some reversible polymer mixtures, prolonged heating of the molten liquid can lead to irreversible hardening of the mixture, due to the propensity of maleimide compounds to undergo a 2+2 cycloaddition reaction when exposed to UV light. As a result of the cycloaddition reaction, an irreversible polymerization or hardening of the material can occur, which can render the composition unacceptable for some uses such as in a solid inkjet printer. Adding a radical scavenger to those compositions can thus prevent or significantly slow down the cycloaddition reaction, thereby preventing the irreversible polymerization from occurring, and allowing the molten liquids to maintain their low melt viscosities for a longer period of time.

Where the radical scavenger is to be included, any suitable radical scavenger can be used. Suitable radical scavengers include, for example, sorbitol, methylether hydroquinone, t-butylhydroquinone, hydroquinone, 2,5-di-1-butylhydroquinone, 2,6-di-tert-butyl-4-methyl phenol (or BHT for butylhydroxytoluene), 2,6-di-t-butyl-4-methoxyphenol, nitroxides, 2-tert-butyl-4-hydroxyanisole, 3-tert-butyl-4-hydroxyanisole, propyl ester 3,4,5-trihydroxy-benzoic acid, 2-(1,1-dimethylethyl)-1,4-benzenediol, diphenylpicrylhydrazyl, 4-tert-butylcatechol, N-methylaniline, p-methoxydiphenylamine, diphenylamine, N,N'-diphenyl-p-phenylenediamine, p-hydroxydiphenylamine, phenol, octadecyl-3-(3,5-di-tert-butyl-4-hydroxyphenyl)propionate, tetrakis(methylene(3,5-di-tert-butyl)-4-hydroxy-hydrocinnamate)methane, phenothiazines, alkylamidonoisoureas, thiodiethylene bis(3,5,-di-tert-butyl-4-hydroxy-hydrocinnamate), 1,2,-bis(3,5-di-tert-butyl-4-hydroxyhydrocinnamoyl)hydrazine, tris(2-methyl-4-hydroxy-5-tert-butylphenyl)butane, cyclic neopentanetetrayl bis(octadecyl phosphite), 4,4'-thiobis(6-tert-butyl-m-cresol), 2,2'-methylenebis(6-tert-butyl-p-cresol), oxalyl bis(benzylidenehydrazide), and naturally occurring antioxidants such as raw seed oils, wheat germ oil, tocopherols, and gums, and mixtures thereof. Suitable nitroxides include, for example, 2,2,6,6-tetramethyl-1-piperidinyloxy (TEMPO), 2,2,6,6-tetraethyl-1-piperidinyloxy, 2,2,6-trimethyl-6-ethyl-1-piperidinyloxy, 2,2,5,5-tetramethyl-1-pyrrolidinyloxy (PROXYL), dialkyl nitroxide radicals such as di-t-butyl nitroxide, diphenyl nitroxide, t-butyl-t-amyl nitroxide, 4,4-dimethyl-1-oxazolidinyloxy (DOXYL), 2,5-dimethyl-3,4-di carboxylic-pyrrole, 2,5-dimethyl-3,4-diethylester-pyrrole, 2,3,4,5-tetraphenyl-pyrrole, 3-cyano-pyrroline-3-carbamoyl-pyrroline, 3-carboxylic-pyrroline, 1,1,3,3-tetramethyl-isoindolin-2-yloxyl, 1,1,3,3-tetraethylisoindolin-2-yloxyl, porphyrexide nitroxyl radicals such as 5-cyclohexyl porphyrexide nitroxyl and 2,2,4,5,5-pentamethyl-D3-imidazoline-3-oxide-1-oxyl and the like, galvinoxyl and the like, 1,3,3A trimethyl-2-azabicyclo[2,2,2]octane-5-oxide-2-oxide, 1A azabicyclo[3,3,1]nonane-2-oxide, and the like. Substituted variants of these radical scavengers can also be used, such as 4-hydroxy-TEMPO, 4-carboxy-TEMPO, 4-benzoxyloxy-TEMPO, 4-methoxy-TEMPO, 4-carboxylic-4-amino-TEMPO, 4-chloro-TEMPO, 4-hydroxylimine-TEMPO, 4-oxo-TEMPO, 4-oxo-TEMPO-ethylene ketal, 4-amino-TEMPO, 3-carboxyl-PROXYL, 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3-maleimido-PROXYL, 3,4-di-t-butyl-PROXYL, 3'-carboxylic-PROXYL, 2-di-t-butyl-DOXYL, 5-decane-DOXYL, 2-cyclohexane-DOXYL, and the like.

Optionally, many commercial antioxidant stabilizers function by trapping free radicals and thus may be used as a radical scavenger. For example, IRGASTAB® UV 10 is a nitroxide and may suitably be used. Other suitable compounds may include, for example, NAUGARD® 524, NAUGARD® 635, NAUGARD® A, NAUGARD® 1-403, and NAUGARD® 959, commercially available from Crompton Corporation, Middlebury, Conn.; NAUGARD® 76, NAUGARD® 445, and NAUGARD® 512 commercially available by Uniroyal Chemical Company; IRGANOX® 1010 and IRGASTAB® UV 10, commercially available from Ciba Specialty Chemicals; GENORAD™ 16 and GENORAD™ 40 commercially available from Rahn A G, Zurich, Switzerland, and the like, as well as mixtures thereof.

The radical scavenger may be present in the composition in any effective amount. For example, it may be present in an amount of from about 0.01% to about 15% by weight of the composition, such as from about 0.05% to about 12% by weight of the composition, from about 0.1% to about 10% by weight of the composition, or from about 1% to about 8% or about 2% to about 5% by weight of the composition.

In the molten state, where the composition is heated to above the melting point of the reverse polymer material, the composition is a very low viscosity liquid. For example, the liquid composition has a viscosity of from about 1 to about 100 cPs, such as from about 1 to about 50 cPs, from about 2 or from about 5 to about 10 or about 15 cPs at a temperature above the melting point of the reverse polymer material. For example, in one embodiment, and for use in an ink jet printing apparatus, it is desired that the liquid composition has a viscosity of from about 1 to about 100 cPs, such as from about 1 to about 50 cPs, from about 1 or from about 2 to about 30 or about 40 cPs, or from about 2 to about 20 cPs, at a temperature of from about 60 to about 140° C., such as from about 65 or from about 70 to about 125 or about 130° C., such as from about 75 to about 120° C. However, as the composition is cooled, cycloaddition takes place, resulting in a hard polymer with excellent film forming and adhesion characteristics.

Although embodiments of the adhesive composition can include other additives for their known uses, it is desired in embodiments that the adhesive properties of the composition are derived only from the maleimide monomer units or species and furan monomer units or species. Thus, for example, the adhesive composition in embodiments is completely or substantially free of any epoxy compounds, acrylate compounds, and the like that provide adhesive effect. Such additional adhesive materials are excluded, for example, because they tend to irreversibly interact with the substrates themselves, preventing easy removal of the adhesive composition when adhesion is not desired.

Composition Application Methods

The compositions of the present disclosure can be used in a wide variety of applications where it is desired to form an adhesive bond via a hard polymer film. The bond can be formed between adjoining surfaces or objects of a wide variety of materials, including metals such as aluminum, stainless steel, and the like; glass; plastics; polymeric films; rubber; paper including plain paper, coated paper, cardboard, and the like; treated cellulosics; wood; ceramic; stone; and the like. In embodiments, the two adjoining surfaces can be of the same type of material or they can be different types of materials.

The adhesive compositions can be applied to the substrates to be bonded by any suitable method without particular limitations, with the adhesive composition being placed between and in contact with the substrates. For example, the adhesive compositions can be applied by brushing, dabbing, bar coating, curtain coating, screen printing, spraying, dipping, extruding, ink jet printing, and the like. The compositions can be applied to only one of the surfaces to be joined or the compositions can be applied onto both surfaces to be joined, as desired.

The adhesive composition can be provided in any suitable form, such as liquid, gel, paste, solid, and the like. In some embodiments, the adhesive composition is applied onto the first and/or second substrate in liquid form and the other substrate can be applied over the adhesive composition. Thereafter, the adhesive composition is allowed to cool and cause the Diels-Alder reaction to occur to form the desired adhesive bond. For example, in these embodiments, the adhesive composition can be applied in liquid form at elevated temperature above room temperature, and thereafter cooled to undergo the Diels-Alder reaction, or a liquid adhesive composition can be applied in liquid form at room temperature, and thereafter heated and then cooled to undergo the Diels-Alder reaction. However, in other embodiments, the adhesive composition can be applied onto the substrate in solid form. In these embodiments, for example, the adhesive composition can be interposed between the first and second substrates, such as by being applied to the first substrate in the form of a sheet or discrete shapes. Thereafter, the composition can be heated to its liquid state and then allowed to cool and cause the Diels-Alder reaction to occur to form the desired adhesive bond.

In some embodiments, and depending upon the substrates to be bonded together, the adhesive compositions are particularly useful in digital image processing applications, such as ink jet printing, because the low viscosity properties of the composition in the liquid state make the compositions amendable to ink jet printing. This allows precise application of the adhesive composition to desired areas of a substrate, such as in manufacturing processes, based on digital printing processes, where the printed liquid composition hardens or cures to form the desired adhesive bond.

When the composition is applied onto a substrate using digital ink jet printing, it can be applied at any desired thickness and amount. The composition can be applied in at least one pass over the substrate, or it can be applied as multiple, at least partially overlapping passes over the substrate.

In another embodiments, particularly where the adhesive composition is solid when at room temperature, the adhesive composition can similarly be applied for example by ejecting it through the tip of a hot melt glue gun. Here, the adhesive composition can be provided in the form of a solid stick, where the end of the stick is melted at the tip of a glue gun and the adhesive is thereafter applied in liquid form.

An additional feature of the adhesive compositions is that the adhesion process is reversible. For example, the adhesive composition can be heated to above room temperature to return the adhesive composition to its non-adhesive liquid state. This heating reverses the cycloaddition reactions, which reverses the adhesion between the objects. The objects can then be easily separated without damage to the adhered surfaces. The surfaces can then be rejoined by allowing the adhesive composition to again cool, and the adhesion/separation can be repeated. Alternatively, the surfaces can be retained separate, optionally with wiping off of the adhesive composition to provide clean, undamaged surfaces.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

General Procedure for Synthesis of Bismaleimides

In a 500 mL RBF (round-bottomed flask) equipped with a magnetic stir bar was dissolved maleic anhydride (10.5 eq) in 75 mL DMF (dimethylformamide). The resulting solution was chilled on ice and the 1,8-octanediamine (5 eq) dissolved in DMF (75 mL) was added dropwise over ~20 min. The ice bath was removed, and sodium acetate (1 eq) and acetic anhydride (11 eq) were added in one portion, and the mixture stirred overnight at 50° C. The mixture turned dark brown within 30 minutes of the addition of NaOAc and Ac$_2$O. DMF was removed by vacuum distillation (60° C.), and DCM (dichloromethane) (150 mL) was added to the dark brown mixture. The organic layer was extracted with NaHCO$_3$ (5×100 mL), dried over MgSO$_4$, and the solvent removed under vacuum. The resulting compounds were purified by column chromatography.

1,1'-(octane-1,8-diyl)bis(1H-pyrrole-2,5-dione) (denoted M1)

The general procedure was carried out using maleic anhydride (14.27 g, 146 mmol), 1,8-octanediamine (10.0 g, 69.3 mmol), sodium acetate (1.14 g, 13.9 mmol) and acetic anhydride (15.57 g, 153 mmol). The resulting compound was purified by column chromatography (98:2 DCM:EtOAc), and the product obtained as a white solid (5.2 g/25%).

1,1'-(cyclohexane-1,3-diylbis(methylene))bis(1H-pyrrole-2,5-dione) (denoted M2)

The general procedure was carried out using maleic anhydride (20.59 g, 210 mmol), 1,3-cyclohexanebis(methylamine) (14.22 g, 100 mmol), sodium acetate (1.64 g, 20 mmol), and acetic anhydride (22.46 g, 220 mmol). The resulting compound was purified by column chromatography (98:2 DCM:EtOAc), and the product obtained as a white solid (3.55 g/12%).

1,1'-(1,3-phenylenebis(methylene))bis(1H-pyrrole-2,5-dione) (denoted M3)

The general procedure was carried out using maleic anhydride (20.59 g, 210 mmol), m-xylylenediamine (13.62 g, 100 mmol), sodium acetate (1.64 g, 20 mmol), and acetic anhydride (22.46 g, 220 mmol). The resulting compound was purified by column chromatography (97:3 DCM:EtOAc), and the product obtained as a white solid (6.51 g/22%).

1,1'-((ethane-1,2-diylbis(oxy))bis(ethane-2,1-diyl))bis(1H-pyrrole-2,5-dione) (denoted M4)

The general procedure was carried out using maleic anhydride (13.23 g, 135 mmol), 2,2'-(ethylenedioxy)bis(ethylamine) (10.0 g, 67.5 mmol), sodium acetate (1.11 g, 13.5 mmol), and acetic anhydride (15.15 g, 148 mmol). The resulting compound was purified by column chromatography (95:5 DCM:EtOAc), and the product obtained as a white solid (4.5 g/22%).

1,1',1"-(nitrilotris(ethane-2,1-diyl))tris(1H-pyrrole-2,5-dione) (denoted M5)

In a 500 mL round-bottomed flask under argon was dissolved maleic anhydride (20.1 g, 205 eq) in 75 mL DMF. The resulting solution was chilled on ice and then tris(2-aminoethyl)amine (10.0 g, 68.4 mmol) dissolved in DMF (75 mL) was added dropwise over ~20 min. The ice bath was removed, and sodium acetate (1.68 g, 20.52 mmol) and acetic anhydride (23.04 g, 226 mmol) were added in one portion, and the mixture stirred overnight at 50° C. The mixture turned dark brown within 30 minutes of the addition of NaOAc and $Ac_2O$. DMF was removed by vacuum distillation (60° C.), and DCM (150 mL) was added to the dark brown mixture. The organic layer was extracted with $NaHCO_3$ (5×100 mL), dried over $MgSO_4$, and the solvent removed under vacuum. The resulting compound was purified by column chromatography (95:5 DCM:EtOAc), to yield a light yellow solid (8.0 g, 30%).

General Procedure for Synthesis of Bisfurans

To a 500 mL RBF equipped with a magnetic stir bar was added the 1,8-octanediamine (47.9 eq), triethylamine (95.7 eq), DMAP (4-Dimethylaminopyridine) (1 eq) and DCM (200 mL). The solution was chilled on ice, then furoyl chloride (100 eq) in DCM (50 mL) was added dropwise. The ice bath was removed, and the mixture stirred at room temperature overnight. The organic layer was extracted with $NaHCO_3$ (5×100 mL), dried over $MgSO_4$, and the solvent removed under vacuum. The resulting compounds were purified by column chromatography.

N,N'-(octane-1,8-diyl)bis(furan-2-carboxamide) (denoted F1)

The general procedure was carried out using 1,8-octanediamine (10.0 g, 69.3 mmol), triethylamine (14.2 g, 141 mmol), DMAP (0.17 g, 1.35 mmol) and furoyl chloride (19.0 g, 146 mmol). The resulting compound was purified by column chromatography (98:2 DCM:EtOAc), and the product obtained as a white solid (21.5 g/92%).

N,N'-(cyclohexane-1,3-diylbis(methylene))bisuran-2-carboxamide) (denoted F2)

The general procedure was carried out using 1,3-cyclohexanebis(methylamine) (10.0 g, 70.3 mmol), triethylamine (14.2 g, 141 mmol), dimethylaminopyridine (0.17 g, 1.41 mmol), and furoyl chloride (19.0 g, 146 mmol). The resulting compound was purified by column chromatography (95:5 DCM:EtOAc), and the product obtained as a white solid (3.5 g/15%).

N,N'-(1,3-phenylenebis(methylene))bis(furan-2-carboxamide) (denoted F3)

The general procedure was carried out using m-xylylenediamine (10.0 g, 73 4 mmol), triethylamine (14.9 g, 147 mmol), dimethylaminopyridine (0.17 g, 1.41 mmol), and furoyl chloride (20.13 g, 154 mmol). The resulting compound was purified by column chromatography (95:5 DCM:EtOAc), and the product obtained as a white solid (21.8 g/92%).

N,N'-((ethane-1,2-diylbis(oxy))bis(ethane-2,1-diyl))bis(furan-2-carboxamide) (denoted F4)

The general procedure was carried out using 2,2'-(ethylenedioxy)bis(ethylamine) (10.0 g, 67.5 mmol), triethylamine (13.66 g, 135 mmol), dimethylaminopyridine (0.17 g, 1.41 mmol), and furoyl chloride (18.5 g, 142 mmol). The resulting compound was purified by column chromatography (95:5 DCM:EtOAc), and the product obtained as a white solid (10.9 g/48%).

N,N',N"-(nitrilotris(ethane-2,1-diyl))tris(furan-2-carboxamide) (denoted F5)

In a 500 mL RBF under argon was added the 1,8-octanediamine (10.0 g, 68.4 mmol), triethylamine (20.76 g, 205 mmol), DMAP (0.68 g, 20.5 mmol) and DCM (350 mL). The solution was chilled on ice, then furoyl chloride (27.7 g, 212 mmol) in DCM (150 mL) was added dropwise. The ice bath was removed, and the mixture stirred at room temperature overnight. The organic layer was extracted with $NaHCO_3$ (5×100 mL), dried over $MgSO_4$, and the solvent removed under vacuum. The resulting compound was purified by column chromatography (99:1 DCM:EtOAc) to yield a white solid (16.1 g, 82%).

The bismaleimides M1 to M4 and bisfuran F1 to F4 prepared above are represented by the following structures were formed, where R the linking group R is varied as shown:

| Compound | R |
|---|---|
| M1, F1 | (linear alkyl chain) |
| M2, F2 | (cyclohexyl) |
| M3, F3 | (phenyl) |
| M4, F4 | –CH₂OCH₂CH₂OCH₂– |

The trigonal maleimide M5 and trigonal furan F5 are represented by the following structures:

Example 1

A mixture of the pairs of maleimide and furan M1 and F1 was made by mixing the maleimide and the furan on about a 1:1 molar basis. The sample was used for the following testing and analysis.

Examples 2-5

Similar to Example 1, mixtures of the pairs of maleimides and furans (M2 and F2, M3 and F3, M4 and F4, M5 and F5) were made by mixing the maleimide and the respective furan on about a 1:1 molar basis. The samples were used for the following testing and analysis.

Analysis

The testing showed that heating the solid maleimide/furan mixtures above their melting points resulted in very low viscosity liquids, while cooling of the mixtures resulted in Diels-Alder coupling, resulting in the formation of polymers. Heating the polymers above the melting point of the constituent maleimide/furan reverses the process, re-generating the low viscosity liquid. The reversibility of the process was verified by $^1$H NMR spectroscopy and DSC.

Figure 1A:
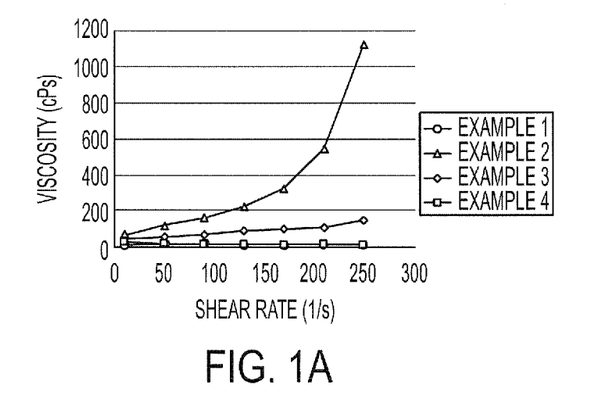
FIG. 1A and FIG. 1B show viscosity properties of coatings according to the Examples.
Figure 1B:
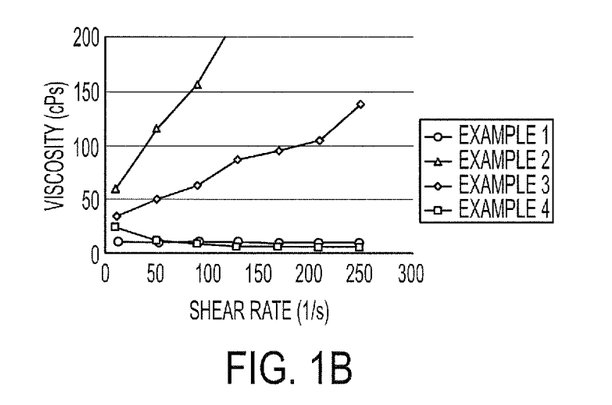

The mixtures were then heated to above their melting points to measure the viscosity behavior of the mixtures. The mixture of Example 1 (mixture of M1 and F1) was heated to 120° C.; the mixture of Example 2 (mixture of M2 and F2) was heated to 190° C.; the mixture of Example 3 (mixture of M3 and F3) was heated to 150° C.; and the mixture of Example 4 (mixture of M4 and F4) was heated to 90° C. Viscosities were measured using an AR 2000 viscometer, available from TA Instruments. Measurements were made at 100 s$^{-1}$ for 25 minutes, using a 25 mm plate assembly, set at a gap width of 200 μm. The results are shown in FIGS. 1A and 1B, where FIG. 1B is a magnified scale of a portion of FIG. 1A. The dilatant behavior of the mixtures of Examples 3 and 4 is believed to be due to the higher temperatures required for melting and viscosity measurement of these particular mixtures, which resulted in an irreversible cross-linking reaction.

Figure 2:
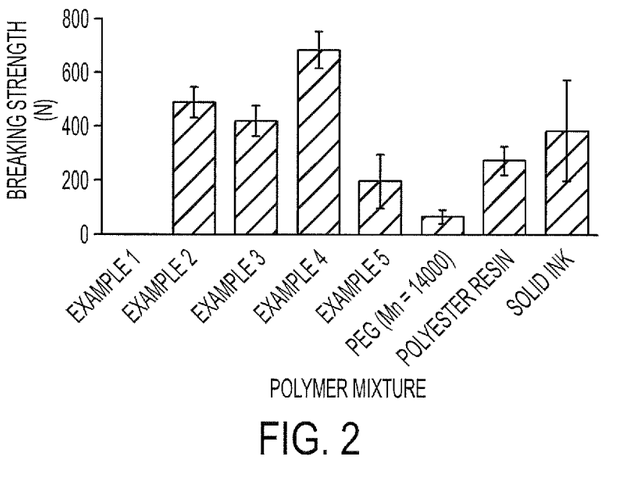
FIG. 2 shows breaking tensile strengths for adhesive compositions according to the Examples.

The adhesion provided by the compositions of the Examples was quantified using a technique based on the American Society for Testing and Materials (ASTM) Method D2095, used for measuring the tensile strength of adhesives. A controlled amount of each mixture was melted between two pre-heated stainless steel dowels, and, after cooling, tested for tensile adhesive strength using an Instron 3367. The breaking strength results as measured are shown in FIG. 2. For comparison purposes, FIG. 2 also includes measurements for polymer films formed from a polyethylene glycol (PEG), a solid ink used in the Xerox COLORQUBE® printers, and a polyester resin used to form toner particles for use in conventional copiers and printers such as the Xerox DC700 machine.

A range of values were observed, as the Example 1 mixtures completely failed upon handling of the dowels after they had cooled to room temperature, while the more brittle polymers of Examples 2 and 3 successfully fastened the dowels, but had lower adhesive strength than the more flexible Example 4. Classical epoxy and acrylate adhesives were not tested in this study, as it is understood that these commercial adhesives would be far superior in terms of their adhesive strength. Nevertheless, the polymer compositions of the Examples, using Diels-Alder chemistry, demonstrate considerably higher adhesion than a typical film forming polymer such as polyethylene glycol (PEG, M$_n$=14,000), or of the conventional polyester toner resin. Furthermore, the adhesive compositions of the Examples possess reversible adhesion properties, in that the adhesion can be reversed by heating the composition to remelt the material.

Solidification time was also found to be dependent upon the spacer chemistry of the materials. Attempts to measure the solidification time were made using Time Resolved Optical Microscopy (TROM); however, these attempts were unsuccessful because only the film of Example 1 displayed any degree of crystallinity while the remaining three films were all amorphous and thus were not visible by the optical methods used in the TROM technique. Instead, simple tapping of the films with a spatula was used, where an audible click was denoted as complete solidification of the polymer. In this testing, the films of both Example 1 and Example 4 took several hours to completely harden, while films of Example 2 and Example 3 solidified in seconds. A combination of the materials was also tested for solidification time, and it was found that an 80:20 mixture of Example 4 and Example 3 resulted in a clear, non-cracking film that hardened within minutes.

It will be appreciated that various of the above-disclosed and other features and functions, or alternatives thereof, can be combined into many other different systems or applications. Also, various presently unforeseen or unanticipated alternatives, modifications, variations or improvements therein can be subsequently made by those skilled in the art, and are also intended to be encompassed by the following claims.

What is claimed is:

1. A method of joining two objects, comprising:
applying an adhesive composition between and in contact with a first object and a second object, and
allowing the adhesive composition to harden to form an adhesive bond between the first and second objects,
wherein the adhesive composition consists essentially of an optional stabilizer and a reversible polymer material that can reversibly transition between a liquid state and a solid state by reversible cycloaddition reactions, wherein upon cooling, the reversible polymer material transitions from a liquid state to a solid state by reversible cycloaddition reactions within a time period of less than about 2 minutes.

2. The method of claim 1, wherein the adhesive composition is provided in liquid form and is applied to at least a surface of the first object.

3. The method of claim 2, wherein the adhesive composition is applied by brushing, dabbing, bar coating, curtain coating, screen printing, spraying, dipping, ink jet printing, or extruding the adhesive composition onto the surface of the first object.

4. The method of claim 1, wherein the adhesive composition is provided in liquid form and is separately applied to a surface of the first object and to a surface of the second object before the first and second objects are joined together.

5. The method of claim 1, wherein the first object and the second object are selected from the group consisting of metals, glass, plastic, polymeric film, rubber, paper, treated cellulosics, wood, ceramic, and stone.

6. The method of claim 1, wherein the adhesive composition is applied at a temperature above room temperature and is then cooled to form the adhesive bond.

7. The method of claim 1, wherein the adhesive composition is applied at room temperature and is then heated and subsequently cooled to form the adhesive bond.

8. The method of claim 7, wherein the adhesive composition is applied in the form of a solid.

9. The method of claim 1, wherein the adhesive composition in its liquid state comprises a maleimide compound and a furan compound.

10. The method of claim 9, wherein the maleimide compound is a bismaleimide and the furan compound is a bisfuran of the following structures:

where each R, which can be the same or different, is a linking group.

11. The method of claim 10, wherein R is selected from the group consisting of substituted or unsubstituted linear or branched alkyl groups, substituted or unsubstituted cyclic alkyl groups, substituted or unsubstituted aryl groups, substituted or unsubstituted arylalkyl groups, substituted or unsubstituted alkylaryl groups, and substituted or unsubstituted alkylenedioxy groups.

12. The method of claim 10, wherein R is selected from the group consisting of a $C_6$-alkyl group, a cyclohexyl group, a phenyl group, and a diethyleneoxy group.

13. The method of claim 9, wherein the maleimide compound is a trigonal maleimide and the furan compound is a trigonal furan of the following structures:

where each R', which can be the same or different, is a linking group.

14. The method of claim 13, wherein R' is $NR_3$, and each R is selected from the group consisting of substituted or unsubstituted linear or branched alkyl groups, substituted or unsubstituted cyclic alkyl groups, substituted or unsubstituted aryl groups, substituted or unsubstituted arylalkyl groups, substituted or unsubstituted alkylaryl groups, and substituted or unsubstituted alkylenedioxy groups.

15. The method of claim 14, wherein R is selected from the group consisting of a $C_6$-alkyl group, a cyclohexyl group, a phenyl group, and a diethyleneoxy group.

16. The method of claim 1, wherein the composition includes a radical scavenger as the stabilizer.

17. The method of claim 1, wherein the adhesive composition consists of the optional stabilizer and the reversible polymer material.

18. The method of claim 1, wherein the composition has a viscosity of from about 1 to about 100 cPs at a temperature of from about 60 to about 140° C.

19. A method of joining two objects, comprising:
applying an adhesive composition to a surface of a first object,
contacting a surface of a second object to the adhesive composition on the surface of the first object, and
allowing the adhesive composition to harden to form an adhesive bond between the first and second objects,
wherein the adhesive composition consists essentially of an optional stabilizer and a reversible polymer material that can reversibly transition between a liquid state and a solid state by reversible cycloaddition reactions, wherein the composition has a viscosity of from about 2 to about 20 cPs at a temperature of from about 75 to about 120° C. and upon cooling, the reversible polymer material transitions from a liquid state to a solid state by reversible cycloaddition reactions within a time period of less than about 2 minutes.

20. A method of reversibly joining two objects, comprising:
joining two objects by the method of claim 1,
heating the adhesive composition forming the adhesive bond to break the adhesive bond between the first and second objects, and
separating the first object from the second object,
wherein the heating reversibly transitions the adhesive composition from a solid state to a liquid state by reversing the cycloaddition reactions.

\* \* \* \* \*